United States Patent
Williams et al.

(10) Patent No.: US 9,729,257 B2
(45) Date of Patent: Aug. 8, 2017

(54) ISOLATING AN UPSTREAM NOISE SOURCE IN A CABLE TELEVISION NETWORK

(71) Applicant: Cable Television Laboratories, Inc., Louisville, CO (US)

(72) Inventors: Thomas H. Williams, Louisville, CO (US); David Hunter, Louisville, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 14/864,610

(22) Filed: Sep. 24, 2015

(65) Prior Publication Data

US 2016/0112734 A1    Apr. 21, 2016

Related U.S. Application Data

(60) Provisional application No. 62/054,529, filed on Sep. 24, 2014.

(51) Int. Cl.
*H04N 7/173* (2011.01)
*H04H 20/78* (2008.01)
(Continued)

(52) U.S. Cl.
CPC ............ *H04H 20/78* (2013.01); *H04H 20/12* (2013.01); *H04L 1/004* (2013.01); *H04N 7/102* (2013.01);
(Continued)

(58) Field of Classification Search
CPC ............ H04N 21/2404; H04N 21/442; H04N 21/44245; H04N 21/64738;
(Continued)

(56) References Cited

U.S. PATENT DOCUMENTS

| 4,276,509 | A |   | 6/1981 | Bryant et al. |          |
|-----------|---|---|--------|---------------|----------|
| 4,520,508 | A | * | 5/1985 | Reichert, Jr. | H04B 3/28 |
|           |   |   |        |               | 348/E7.069 |

(Continued)

OTHER PUBLICATIONS

Proactive Network Maintenance Using Pre-equalization, DOCSIS Best Practices and Guidelines, CM-GL-PNMP-V02-110623, Jun. 23, 2011, CableLabs.

*Primary Examiner* — An Son P Huynh
(74) *Attorney, Agent, or Firm* — Duft Bornsen & Fettig LLP; Gregory T. Fettig

(57) ABSTRACT

Systems and methods presented herein provide for isolating an upstream noise source in a cable television network. In one embodiment, a cable television network is communicatively coupled to a plurality of CPEs through a node. The cable television network comprises a CMTS with a CPE polling module and a noise monitor communicatively coupled to the CMTS through the node of the cable television network. The noise monitor is operable in a band of frequencies unused by the CPEs for upstream communications to determine when noise in the band breaches a threshold level, and to indicate when the noise breaches the threshold level to the CPE polling module. The CPE polling module then polls each of the CPEs to retrieve transmit power levels and locations of the CPEs, and identifies the first CPE with the intermittently noisy connection based on the retrieved transmit power level and location of the first CPE.

6 Claims, 6 Drawing Sheets

(51) Int. Cl.
*H04L 1/00* (2006.01)
*H04N 7/10* (2006.01)
*H04N 21/442* (2011.01)
*H04N 21/647* (2011.01)
*H04H 20/12* (2008.01)
*H04N 21/61* (2011.01)

(52) U.S. Cl.
CPC ..... *H04N 21/442* (2013.01); *H04N 21/64738* (2013.01); *H04N 21/6118* (2013.01); *H04N 21/6168* (2013.01)

(58) Field of Classification Search
CPC ........... H04N 21/6168; H04N 21/6118; H04N 21/6582; H04N 21/2187; H04N 17/00; H04N 17/004; H04N 17/102; H04N 7/1473; H04N 7/17309; H04H 20/78; H04H 20/12; H04L 1/004
USPC .................. 725/107–108, 123–125
See application file for complete search history.

(56) References Cited

U.S. PATENT DOCUMENTS

| | | | |
|---|---|---|---|
| 5,294,937 A | 3/1994 | Ostteen et al. | |
| 5,777,662 A | 7/1998 | Zimmerman | |
| 5,870,513 A * | 2/1999 | Williams | H04B 10/2507 385/24 |
| 5,881,362 A * | 3/1999 | Eldering | H04N 7/17309 348/E7.052 |
| 6,005,518 A | 12/1999 | Kallina | |
| 6,147,700 A * | 11/2000 | Na | H04N 7/102 348/E7.052 |
| 6,344,749 B1 * | 2/2002 | Williams | H05K 9/0069 324/620 |
| 6,711,135 B1 * | 3/2004 | Dziekan | H04H 20/69 348/E17.001 |
| 6,742,186 B1 * | 5/2004 | Roeck | H04L 12/2801 370/449 |
| 6,833,859 B1 | 12/2004 | Schneider et al. | |
| 6,867,596 B1 | 3/2005 | Mizuno | |
| 6,915,530 B1 * | 7/2005 | Kauffman | H04N 7/102 348/E7.052 |
| 7,469,641 B2 * | 12/2008 | Berg | B61F 5/06 105/157.1 |
| 7,788,050 B2 | 8/2010 | Williams | |
| 8,578,437 B2 * | 11/2013 | Nielsen | H04B 3/50 725/125 |
| 8,650,605 B2 | 2/2014 | Zinevich | |
| 9,021,539 B2 | 4/2015 | Stelle | |
| 2002/0159513 A1 * | 10/2002 | Williams | H04L 12/5602 375/222 |
| 2003/0149991 A1 * | 8/2003 | Reidhead | H04L 1/24 725/119 |
| 2005/0010962 A1 * | 1/2005 | Bugajski | H04N 7/10 725/126 |
| 2005/0047442 A1 * | 3/2005 | Volpe | H04L 12/2801 370/480 |
| 2006/0248564 A1 * | 11/2006 | Zinevitch | H04N 17/00 348/E17.001 |
| 2008/0155376 A1 * | 6/2008 | Williams | H04L 1/0045 714/760 |
| 2009/0260049 A1 * | 10/2009 | Urbanek | H04N 7/102 725/125 |
| 2010/0095344 A1 * | 4/2010 | Newby | H04L 12/2801 725/125 |
| 2011/0043640 A1 | 2/2011 | Zinevich | |
| 2012/0213259 A1 * | 8/2012 | Renken | H04N 7/17309 375/222 |
| 2013/0003565 A1 * | 1/2013 | Gotwals | H04L 43/50 370/248 |
| 2013/0291029 A1 * | 10/2013 | Wells | H04N 21/6168 725/78 |
| 2014/0123203 A1 * | 5/2014 | Oliver | H04N 7/102 725/125 |
| 2014/0153624 A1 * | 6/2014 | Wolcott | H04B 15/00 375/224 |

* cited by examiner

| mac_address | channel_width | center_frequency | data | node | latitude | longitude | tx_power | poll_epoch | poll_timestamp |
|---|---|---|---|---|---|---|---|---|---|
| FBEDA5F61DBA | 3200000 | 25000000 | C90119000069FFD6FFD4000110079FFBBFF | 2211336 | 41.162842 | -81.871857 | 405 | 1417633941 | 12/3/2014 14:12 |
| FBEDA5F61DBA | 3200000 | 30000000 | C9011900033FFCD0002005200CFF59FF | 2211336 | 41.162842 | -81.871857 | 432 | 1417633941 | 12/3/2014 14:12 |
| FBEDA5F61DBA | 3200000 | 25000000 | C90119000022FFDFFEB00590065001CFF | 2211336 | 41.162842 | -81.871857 | 405 | 1417721505 | 12/4/2014 14:31 |
| FBEDA5F61DBA | 3200000 | 30000000 | C901190003003DFFED0099001C000300 | 2211336 | 41.162842 | -81.871857 | 407 | 1417721505 | 12/4/2014 14:31 |
| FBEDA577C792 | 3200000 | 25000000 | C90119000FFDFFFE000300000000FFFC00 | 2201515 | 40.84745 | -79.929588 | 375 | 1417633908 | 12/3/2014 14:10 |
| FBEDA577C792 | 3200000 | 30000000 | C90119000FFFFF0000FFFFFFFF0002FFFCFF | 2201515 | 40.84745 | -79.929588 | 390 | 1417633908 | 12/3/2014 14:10 |
| FBEDA577C792 | 3200000 | 25000000 | C90119000FFFEFFFD000300020001FFFDFF | 2201515 | 40.84745 | -79.929588 | 385 | 1417721159 | 12/4/2014 14:25 |
| FBEDA577C792 | 3200000 | 30000000 | C90119000FFFFFFFFD00010002FFFDFFFC00 | 2201515 | 40.84745 | -79.929588 | 385 | 1417721159 | 12/4/2014 14:25 |
| FBEDA577C792 | 3200000 | 25000000 | C9011900000000100090001FFFC0002000 | 2203331 | 40.680945 | -80.135562 | 455 | 1417634038 | 12/3/2014 14:13 |
| FBEDA577C792 | 3200000 | 30000000 | C90119000000FFFD00010004FFFEFFFFFF | 2203331 | 40.680945 | -80.135562 | 455 | 1417634038 | 12/3/2014 14:13 |
| FBEDA577C792 | 3200000 | 21500000 | C9011900000002FFFE00030001FFFC0001000 | 2203331 | 40.680945 | -80.135562 | 455 | 1417721482 | 12/4/2014 14:31 |
| FBEDA577C792 | 3200000 | 30000000 | C90119000FFFEFFFE00030001FFFDFFFCFF | 2203331 | 40.680945 | -80.135562 | 455 | 1417721482 | 12/4/2014 14:31 |
| FBEDA577C752 | 3200000 | 21500000 | C9011900003FFFF00010004000200002FFF | 2203324 | 40.69992 | -80.11673 | 400 | 1417634038 | 12/3/2014 14:13 |
| FBEDA577C752 | 3200000 | 30000000 | C90119000FFFFFA000000030002FFFFFFE00 | 2203324 | 40.69992 | -80.11673 | 420 | 1417634038 | 12/3/2014 14:13 |
| FBEDA577C752 | 3200000 | 21500000 | C90119000000FFF9FFFF00010004FFF000 | 2203324 | 40.69992 | -80.11673 | 395 | 1417721482 | 12/4/2014 14:31 |
| FBEDA577C752 | 3200000 | 30000000 | C90119000FFFDFFFE0004FFFFFFFFFFFD00 | 2203324 | 40.69992 | -80.11673 | 410 | 1417721482 | 12/4/2014 14:31 |
| FBEDA577C6F2 | 3200000 | 25000000 | C90119000FFFF0001000200020000FFFFFF | 2201513 | 40.850609 | -79.918823 | 478 | 1417633808 | 12/3/2014 14:10 |
| FBEDA577C6F2 | 3200000 | 30000000 | C90119000FFFD0001FFFE0001FFFFFFFF | 2201513 | 40.850609 | -79.918823 | 478 | 1417633808 | 12/3/2014 14:10 |
| FBEDA577C6F2 | 3200000 | 25000000 | C9011900000000FFED001000100000FFFFFF | 2201513 | 40.850609 | -79.918823 | 488 | 1417721159 | 12/4/2014 14:25 |
| FBEDA577C6F2 | 3200000 | 30000000 | C90119000FFFFFFFF00100040002FFF | 2201513 | 40.850609 | -79.918823 | 488 | 1417721159 | 12/4/2014 14:25 |
| FBEDA577C6E2 | 3200000 | 25000000 | C90119000FFFFFF0005FFFFFFFFFD000 | 2203729 | 40.835086 | -80.323823 | 428 | 1417633879 | 12/3/2014 14:11 |
| FBEDA577C6E2 | 3200000 | 30000000 | C90119000FFFB00010004FFFF00010001000 | 2203729 | 40.835086 | -80.323823 | 428 | 1417633879 | 12/3/2014 14:11 |
| FBEDA577C6E2 | 3200000 | 21500000 | C9011900000200010005000100040000FFF | 2203729 | 40.835086 | -80.323823 | 428 | 1417721473 | 12/4/2014 14:31 |
| FBEDA577C6E2 | 3200000 | 30000000 | C90119000003FFFF0000000000200001000 | 2203729 | 40.835086 | -80.323823 | 428 | 1417721473 | 12/4/2014 14:31 |
| FBEDA577C6C2 | 3200000 | 21500000 | C90119000001FFF9000FFFFF0003FFFFF | 2203527 | 40.705229 | -79.999226 | 393 | 1417633705 | 12/3/2014 14:08 |
| FBEDA577C6C2 | 3200000 | 30000000 | C9011900000000000002FFFF0003FFFFF | 2203527 | 40.705229 | -79.999226 | 409 | 1417633705 | 12/3/2014 14:08 |
| FBEDA577C6C2 | 3200000 | 21500000 | C90119000FFFE0002000100006FFFFFFA00 | 2203527 | 40.705229 | -79.999226 | 395 | 1417721360 | 12/4/2014 14:29 |
| FBEDA577C6C2 | 3200000 | 30000000 | C90119000FFFFFFFFC000030005FFFD000200 | 2203527 | 40.705229 | -79.999226 | 410 | 1417721360 | 12/4/2014 14:29 |

FIG. 3

ISOLATING AN UPSTREAM NOISE SOURCE IN A CABLE TELEVISION NETWORK

CROSS REFERENCE TO RELATED APPLICATIONS

This patent application is a non-provisional patent application claiming priority to, and thus the benefit of an earlier filing date from, U.S. Provisional Patent Application No. 62/054,529 (filed Sep. 24, 2014), the entire contents of each of which are hereby incorporated by reference.

BACKGROUND

Noise is a problem in many communication schemes and comes in a variety of forms. For example, lightning, sparks, etc., can electromagnetically interfere with communication signals in the Radio Frequency (RF) spectrum. Short burst-like electromagnetic radiation can interfere with communication signals over a broad range of frequencies and is commonly referred to as impulsive noise. Other forms of noise include continuous wave (CW) electromagnetic radiation, such as that occurring with other communication signals located on the same RF frequency. In any case, random noise is ever present and represents a basic challenge to communications engineers.

As communication techniques become more complex (e.g., to satisfy higher data consumption), communication signals can become more susceptible to noise. In the cable television industry, upstream noise (e.g., from households) is problematic because it can affect other households. For example, suppose one cable modem (a.k.a. a customer premise equipment, or "CPE") at one household is experiencing a bad connection that allows noise to leak into the CPE's connection to a network node. That noise can affect other CPEs connected to the network node. And, the CPE needs to use more power to overcome the noise.

Generally, there are many CPEs (e.g., hundreds) coupled to a node. When a CPE is continually "noisy" on the upstream link, the CPE can be more easily located and corrected. However, when the connection is intermittent, it is very difficult to determine which CPE is causing the noise on the upstream link. And, sending repair teams to correct problems that are difficult to find and identify is a costly proposition. For example, when hundreds of CPEs are connected to a cable television node, a cable television repair service may be forced to search each of the CPEs to identify and repair a problem associated with one CPE.

SUMMARY

Systems and methods presented herein provide for isolating/identifying an upstream noise source in a cable television network so that corrections can be made to remove the noise. In one embodiment, a cable television network is communicatively coupled to a plurality of customer premise equipment (CPEs) through a node of the cable television network. The cable television network is operable to identify a first of the CPEs with an intermittently noisy connection. The cable television network comprises a cable modem termination system (CMTS) with a CPE polling module. The cable television network also comprises a noise monitor communicatively coupled to the CMTS through the node of the cable television network. The noise monitor is operable in a band of frequencies unused by the CPEs for upstream communications to determine when noise in the band breaches a threshold level, and to transmit a message at or about the same time the noise breaches the threshold level to the CPE polling module indicating the breach. The CPE polling module, in response to the message, polls each of the CPEs to retrieve transmit power levels and locations of the CPEs, and identifies the first CPE with the intermittently noisy connection based on the retrieved transmit power level and location of the first CPE.

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including software and firmware, are described below.

BRIEF DESCRIPTION OF THE FIGURES

Some embodiments of the present invention are now described, by way of example only, and with reference to the accompanying drawings. The same reference number represents the same element or the same type of element on all drawings.

FIG. 3 is a data structure.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Figure 1:
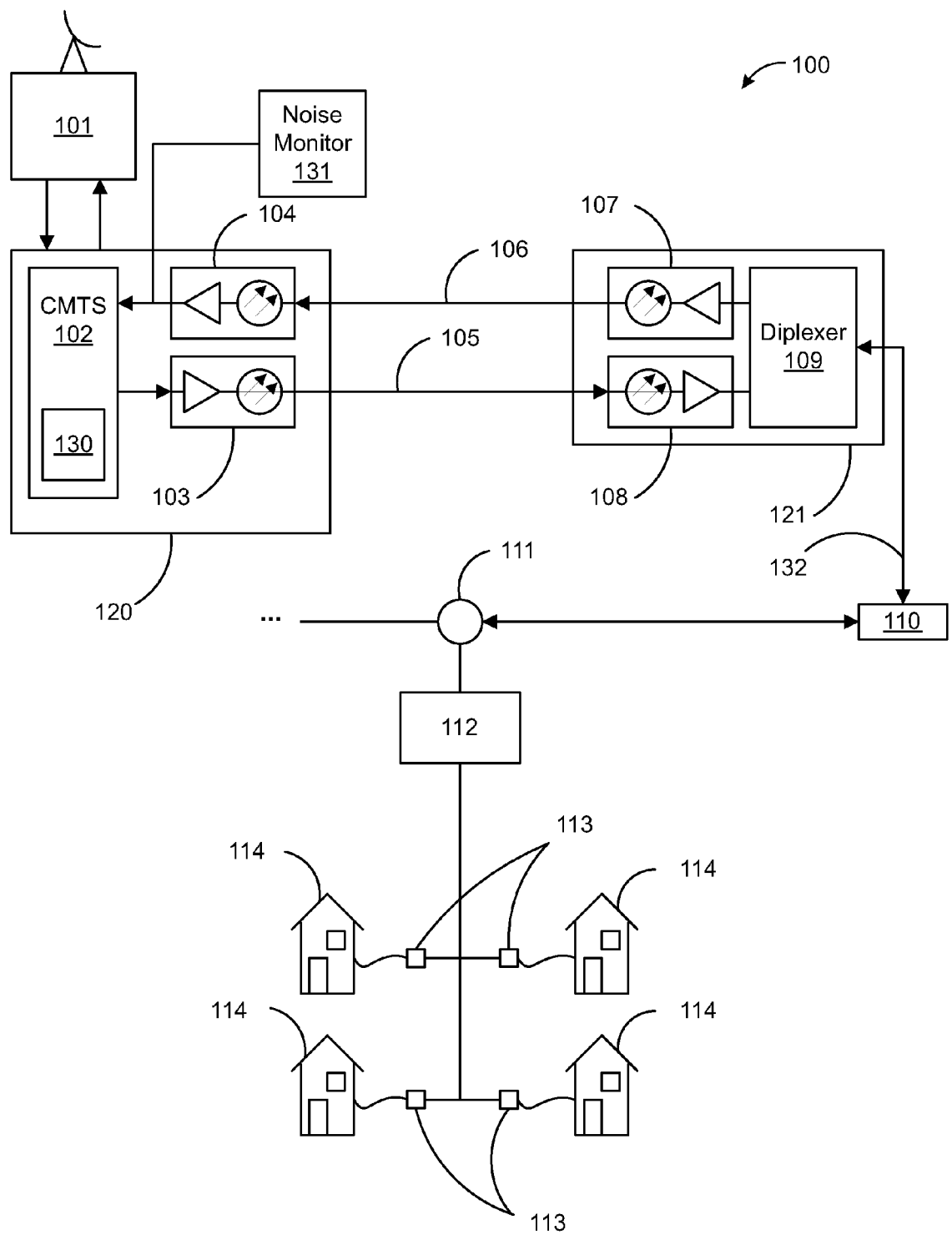
FIG. 1 is a block diagram of a cable television network employing noise monitoring.

FIG. 1 is a block diagram of an exemplary cable television network 100. The cable television communication network 100 employs high speed data services being delivered over devices conforming to the Data Over Cable Service Interface Specification (DOCSIS) specification. The cable television network 100 includes a headend 101 configured with a hub 120. The hub 120 is coupled to a fiber node 121 via optical communication links 105 and 106. The hub 120 typically includes a Cable Modem Termination System (CMTS) 102, an electrical to optical converter 103, and an optical to electrical converter 104. The node 121 is similarly configured with an optical to electrical converter 108 and an electrical to optical converter 107. However, the cable television network 100 may be configured using RF and coaxial connections between the hub 120 and the node 121.

The headend 101 is the source for various television signals. Antennas may receive television signals that are converted as necessary and transmitted over fiber optic cables to the hub 120. Several hubs may be connected to a single headend 101 and the hub 120 may each be connected to several nodes 121 by fiber optic cable links 105 and 106. The CMTS 102 may be configured in the headend 101 or in the hub 120.

Downstream homes/businesses include CPEs such as cable modems and set top boxes. The CPE acts as a host for an Internet Protocol (IP) device such as personal computer. Transmissions from the CMTS 102 to the CPE are carried over the downstream portion of the cable television communication system generally in the band between 54 and 860 MHz. Downstream digital transmissions are continuous and are typically monitored by many CPEs. Upstream transmissions from the CPEs to the CMTS 102 are typically carried in the 5-42 MHz frequency band, the upstream bandwidth being shared by the CPEs that are on-line. However, with greater demands for data, additional frequency bands and bandwidths are continuously being deployed in the downstream and upstream paths.

The CMTS 102 connects the local CPE network to the Internet backbone. The CMTS 102 connects to the downstream path through an electrical to optical converter 103 that is connected to the fiber optic cable 105, which in turn, is connected to an optical to electrical converter 108 at the node 121. The signal is transmitted to a diplexer 109 that combines the upstream and downstream signals onto a single cable. The diplexer 109 allows the different frequency bands to be combined onto the same cable. The downstream channel width in the United States is generally 6 megahertz with the downstream signals being transmitted in the 54 to 860 MHz band. Upstream signals are presently transmitted between 5 and 42 MHz, but again other bands are being considered to provide increased capacity.

After the downstream signal leaves the node 121, the signal is typically carried by a coaxial cable 132. At various stages, a power inserter 110 may be used to power the coaxial line equipment, such as amplifiers or other equipment. The signal may be split with a splitter 111 to branch the signal. Further, at various locations, bi-directional amplifiers 112 may boost and even split the signal. Taps 113 along branches provide connections to subscriber's homes 114 and businesses.

Upstream transmissions from subscribers to the hub 120/headend 101 occur by passing through the same coaxial cable 132 as the downstream signals, in the opposite direction on a different frequency band. The upstream signals are sent typically utilizing Quadrature Amplitude Modulation (QAM) with forward error correction. The upstream signals can employ QPSK or QAM, including 8 QAM, 32 QAM, 64 QAM, 128 QAM, and 256 QAM. Modulation techniques such as Synchronous Code Division Multiple Access (S-CDMA) and Orthogonal Frequency Division Multiple Access (OFDMA) can also be used. Of course, any type of modulation technique can be used, as desired. In DOSCIS 3.1, OFDM modulation will be used on the downstream band of the coaxial cable and OFDMA will be used on the upstream band of the coaxial cable.

Upstream transmissions, in this embodiment, are typically sent in a frequency/time division multiplexing access (FDMA/TDMA) scheme, as specified in the DOCSIS standards. The diplexer 109 splits the lower frequency signals from the higher frequency signals so that the lower frequency, upstream signals can be applied to the electrical to optical converter 107 in the upstream path. The electrical to optical converter 107 converts the upstream electrical signals to light waves which are sent through fiber optic cable 106 and received by optical to electrical converter 104 in the node 120.

Many cable impairments come from the coaxial portion of the cable television communication system. While the downstream cable plant is relatively free of severe impairments, the upstream plant can be afflicted with a variety of impairments. This is because the coaxial cable plant is a linear system that uses a tree and branch architecture. The downstream signals are split yielding many copies of a relatively good signal. The upstream signals, however, are combined, giving any noise source in any home an opportunity to create interference for the transmissions from any and all homes, and additive noise effect called "noise-funneling".

Upstream cable impairments are generally most severe in the 5-15 MHz portion of the 5-42 MHz return band. Shielding breaks in the coaxial cable and improper connections, particularly inside homes, give many noise sources an opportunity to ingress into the upstream signal path. The sources of interference may include broadcast signals, such as radio stations, citizen band radios, and ham radios. Short duration broadband interferences may include lightning, static electricity discharges, and interference from the AC power grid. Interference associated with the power grid in the form of burst noise can have a particularly deleterious effect on upstream signals. The interference may be created by switching or operating loads, appliances with motors using brushes, lighting, etc.

Another cable impairment is called common path distortion (CPD). This impairment is created by downstream signals in the 54-860 MHz band creating non-linear distortion in the upstream frequency band. Corrosion diodes created between dissimilar metals are often to blame. Impairments can be made worse by the lack of continuous calibrated signal sources from remote points. For example, a forward path uses an output of the headend 101 as a continuous reference signal for gain, frequency response, and noise, but the return upstream path has no such reference. This contributes to alignment problems. Additionally, there is difficulty in determining the entry point of ingress in the upstream path. This is especially difficult when the noise is short duration, or transient in nature, such as burst noise.

Although the fiber optic portion (106) of the upstream path is relatively immune to impairments, solid state lasers in the fiber optic link 106 can be affected by burst noise. If the burst noise, which is typically located in the 5-15 MHz portion of the band is strong enough, it can temporarily extinguish (i.e., clip) the laser. This means that the laser stops producing coherent light and transmissions in all frequency bands including those outside the 5-15 MHz band can be affected.

The fiber optic links 105 and 106 are typically driven by laser diodes, such as Fabry Perot and distributed feedback (DBF) laser diodes. Laser diodes begin to "lase" at a certain diode threshold current. Below the threshold current, the laser turns off and causes abrupt clipping of any signal being carried by the laser. At a saturation current, the light output of the laser diode becomes non-linear, causing nonlinear operation to occur. The clipping and/or the nonlinear operation introduces distortion into the optical signal.

In addition to laser clipping, another source of upstream impairment is ingress or burst noise and broadcast noise. For instance, if a transmission is made at 30 MHz and the system receives a relatively large burst of noise between 5 and 10 MHz, the laser output may be clipped from the extra energy of the electromagnetic radiation. Burst noise at lower frequencies can still cause the laser to create an impairment called cross-compression or cross-modulation. This impairment is generally non-linear caused by overloaded amplifiers and clipped lasers. Cross compression noise is a third-order distortion that generally affects all frequencies.

Burst noise energy has also been known to compress or clip upstream active devices. Most of the energy that causes the compression is typically in the 5-15 MHz band, but signals at all other frequencies are affected by cross-compression. This phenomenon is especially noticeable on systems using Fabry-Perot lasers, which have limited dynamic range. Much upstream impairment is caused by laser clipping where the energy causing the clipping may not in the same band as the affected carriers.

Forward Error Correction (FEC), such as Reed-Solomon error correction, on upstream signals can be employed to protect the data from burst noise and other transmission errors. The DOCSIS specification discloses the use of FEC codes using Reed-Solomon linear block codes in the upstream path. However, this has an effect on the amount of data that can be transmitted. For example, error correction generally includes extra bits of data to correct degraded data at the receiving end. Thus, when more bits are used to correct errors at one data rate, fewer bits are used to actually convey the data. And, if burst noise is too severe, the Forward error correction may not be sufficient to correct all of the corrupt data, causing entire FEC block transmissions to fail.

In whatever form, noise is a problem in the cable television industry. Some of the sources of noise occur from improperly connected CPEs in households and businesses. For example, a CPE may be connected to a coaxial termination point in a household. That connection may be loose, frayed, damaged, etc., introducing intermittent noise. In other words, when a CPE coaxial connection is not properly connected, the connection state can be intermittent due to environmental conditions, such as moisture and heat that alter the shielding characteristics from external noise. The external noise can enter the coaxial cable and affect upstream communications from the CPE.

To compensate, the CPE may be commanded to increases the power to overcome the effects of intermittent connection noise. However, the added noise and increase in CPE power affects other CPEs connected to the node 121. The CMTS 102 is configured with a CPE polling module 130 that is operable to poll each of the CPEs from the household/businesses 114 (e.g., via Simple Network Management Protocol (SNMP) and/or DOCSIS messaging) to determine their respective power and/or pre-equalizer values that may be indicative of an improper CPE connection introducing external noise.

In DOCSIS, pre-equalization was a feature that was first included in the DOCSIS 1.1 standard. Pre-equalization was added to improve the upstream performance of CPEs in the presence of RF impairments. Some RF impairments include frequency response, reflections, and group delay. To implement pre-equalization, the CMTS 102 reviews the data coming from a CPE and evaluates the signal quality of the data. If the CMTS 102 determines that the signal quality of the data can be improved, then the CMTS 102 sends equalizer adjustments to the CPE. The CPE applies the equalizer adjustment values, also referred to as coefficients, to its pre-equalizer. The pre-equalizer on the CPE pre-distorts signals transmitted to the CMTS 102 to compensate for RF impairments in the upstream channel. As the pre-distorted signal traverses network 100, the pre-distorted signal will experience the RF impairments in the upstream channel, modifying the pre-distorted signal until it is transformed back into a near-ideal signal at node 121. If further adjustments are warranted, then the CMTS 102 may send more pre-equalizer values to the CPE. This process may repeat every thirty seconds, resulting in pre-equalizer coefficients that vary over time for each CPE in network 100 as the upstream channel characteristics change over time.

In DOCSIS 2.0 and 3.0, 24 taps are used as part of the pre-equalization filter. The taps are implemented using delay lines applied to the RF signal generated by the CPE. Each delay line introduces a delay in time on the RF signal, and each delay line includes a variable gain amplifier. The output of all the taps along with the RF signal are summed together to generate a pre-distorted signal that is sent by the CPE to the CMTS 102. The pre-equalization values at the CPE correspond with the gain settings for each of the tap amplifiers, along with a gain setting for an amplifier on the original RF signal.

Generally, tap 8 is considered the main tap. Tap 8 in DOCSIS is the RF signal that is fed to the taps by the CPE. Typically the main tap has the highest coefficient value in the pre-equalization filter, with the remaining taps having some lower value. This would indicate that the upstream channel is relatively unimpaired. However, if the upstream channel is impaired, then it is possible that the coefficients for taps 1-7 and 9-24 are increasing to compensate for this impairment. One metric for an RF impairment in the upstream channel is the ratio of the main tap (tap 8) to the remaining taps (taps 1-7 and taps 9-24), referred to as MTR. MTR can often change during intermittent connection issues with the CPE. Therefore, polling CPEs for their pre-equalizer values can allow for a correlation to be found between noise detected by noise monitor 131 and possible CPEs that are experiencing intermittent connection issues to network 100. More information about DOCSIS pre-equalization can be found in "Proactive Network Maintenance Using Pre-equalization", reference number CM-GL-PNMP-V02-110623, released by Cable Television Laboratories on Apr. 15, 2010 and incorporated by reference herein.

Upstream noise from any one house can affect all homes in a fiber node. This problem is referred to a "noise funneling". The presence of data transmissions hides some of the noise energy, but it is possible to make measurements while no upstream transmissions are occurring in a frequency band. CMTS 102, which schedules upstream transmissions, knows when an upstream band will be vacant and available for noise measurements.

The cable television network 100 is also configured with a noise monitor 131 that is coupled in the upstream communication link. The noise monitor 131 is operable to monitor a band of frequencies unused by the CPEs on the node 121 to determine whether noise is increasing across the spectrum. For example, the noise monitor 131 may monitor a band of frequencies between 5 MHz and 15 Mhz where CPEs do not typically transmit upstream communications. Generally, this band of frequencies is deemed "noisy" to begin with and there are other less noisy portions of the spectrum for CPEs to use. However, when one CPE on the node 121 is introducing noise into the upstream communications, that noise can be wideband and therefore witnessed in the unused band of frequencies. The noise monitor 131 detects this noise such that the CPE polling module 130 can associate the noise with intermittent connection problems with individual CPEs.

Figure 2:
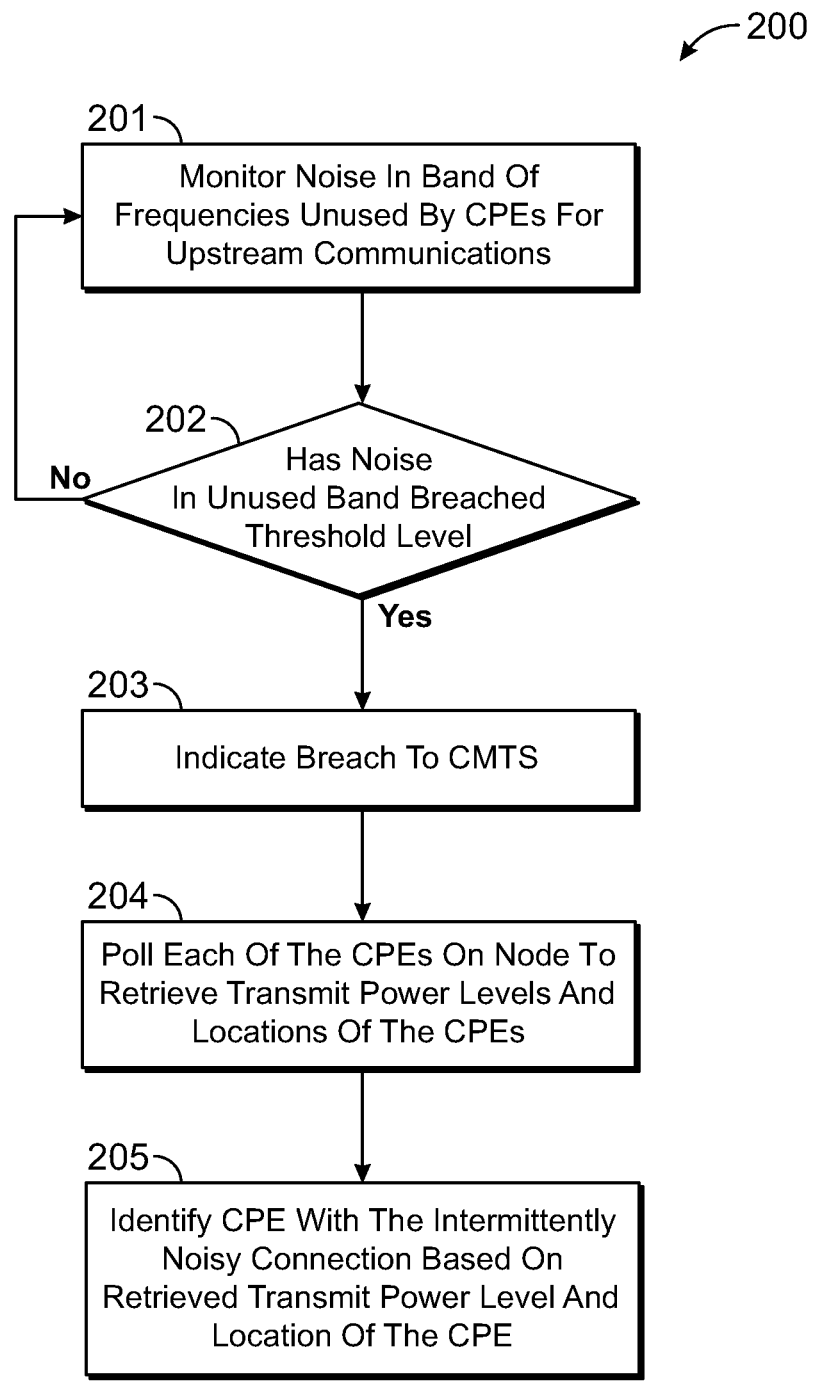
FIG. 2 is a flowchart of an exemplary process operable with the cable television network of FIG. 1.

FIG. 2 is a flowchart of an exemplary process 200 operable with the cable television network 100 of FIG. 1. In this embodiment, the noise monitor 131 continually monitors noise in a band of frequencies unused by the CPEs for upstream communications, in the process element 201. For example, the noise monitor 131 may establish some sort of baseline threshold level. The noise monitor 131 may then use this threshold noise level to determine whether noise in the band of unused frequencies has breached the threshold level, in the process element 202. If not, the noise monitor continually monitors the band of unused frequencies.

If noise has increased past some threshold level in the band of unused frequencies, then the noise monitor 131 indicates that breach to the CMTS 102, in the process element 203. For example, the noise monitor 131 may format and transmit a DOCSIS message, a SNMP message, etc., to the CMTS 102 indicating that the noise has breached the threshold level. In doing so, the noise monitor 131 may even continually send some standard message to the CMTS 102 that the CMTS 102 decodes to determine whether noise has breached the threshold. For example, the noise monitor 131 may itself be a CPE configured to operate in the band of frequencies unused by the other CPEs. Accordingly, the CPE may be able to communicate with the CMTS 102 in a manner that the other CPEs can. Instead of increasing power to overcome the introduced noise in the band of unused frequencies, the CPE/noise monitor 131 may continually send a DOCSIS formatted message that is encoded with error correction capabilities. Once the CMTS 102 decodes the message according to the error correction associated with the message, the CMTS 102 may determine that the message has unrecoverable errors and, therefore, determine that noise has breached the threshold level.

In any case, the CPE polling module 130 polls each of the CPEs on the node 121 to retrieve transmit power levels and/or pre-equalizer values, and locations of the CPEs, in the process element 204. For example, each CPE may be configured to monitor its own power levels. And, each CPE when installed in a household/business, its location in terms of latitude and longitude of that households/business is instantiated with the CPE. Using standard DOCSIS and/or SNMP messaging, the CPE polling module 130 contacts each of the CPEs connected to the node 121 when the noise detected by the noise monitor 131 has increased past the threshold level. The CPE polling module 130 requests the power level and location of each CPE such that the CPE polling module 130 can identify which of the CPEs is transmitting at a higher power and/or have pre-equalizer values that have changed during the noise event, in the process element 205.

An example of information that may be retrieved by the CPE polling module 130 is illustrated in the data structure 300 of FIG. 3. The data structure 300 is retained by the CPE polling module 130 and logs an entry each time a CPE is polled on the node 121. The data structure 300 illustrates the media access control (MAC) address (300) of each CPE and the time it was polled (305). Also in the data structure 300 is the latitude 302 and the longitude 304 of the CPE along with its transmit power at the time it was polled. Higher transmit powers (e.g., 478 and 488 associated with the CPE was MAC address is F8EDA5 77C6 E2) indicate that the CPE is experiencing noise which may be caused by an intermittent connection. By identifying the problematic CPE, the CPE polling module 130 can place the CPE in a watchlist status to determine whether the noise is frequent albeit intermittent. Then, the CPE polling module 130 can notify the appropriate response team to locate the CPE and correct the problem (e.g., fix the intermittent connection).

Figure 4:
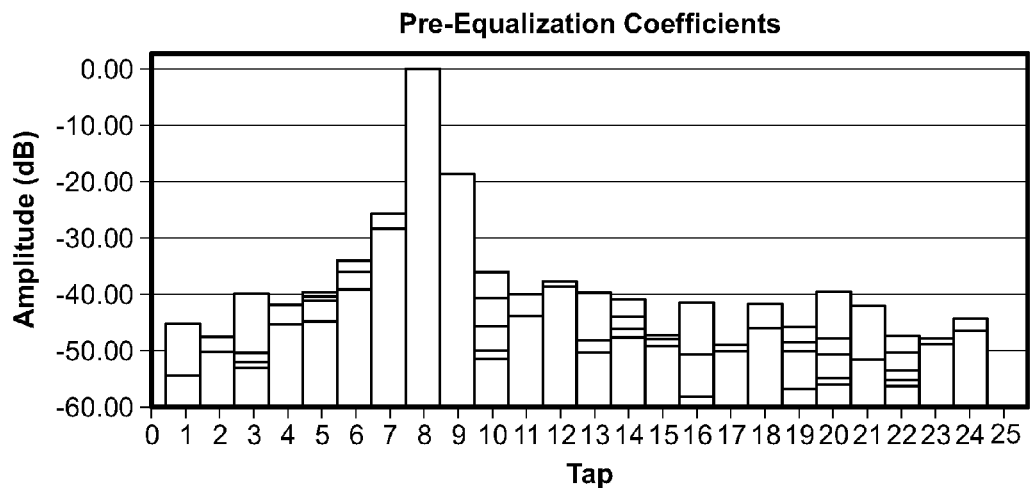
FIGS. 4-7 are graphs illustrating CPE pre-equalizer values in the time domain and resulting channel frequency responses used to correlate noise with intermittent connections with individual CPEs.
Figure 5:
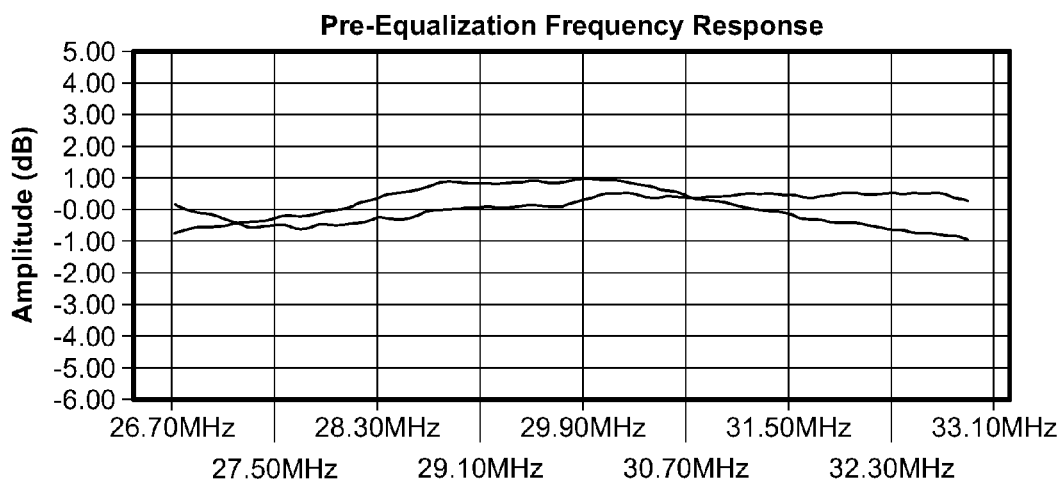
Figure 6:
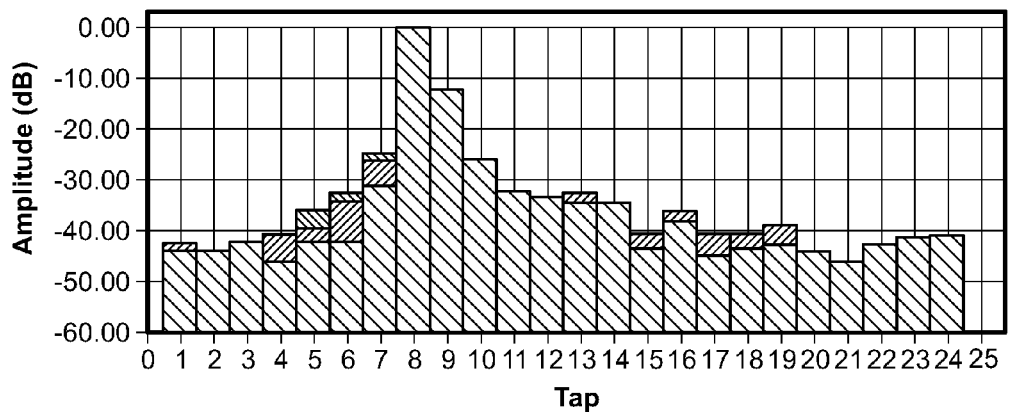
Figure 7:
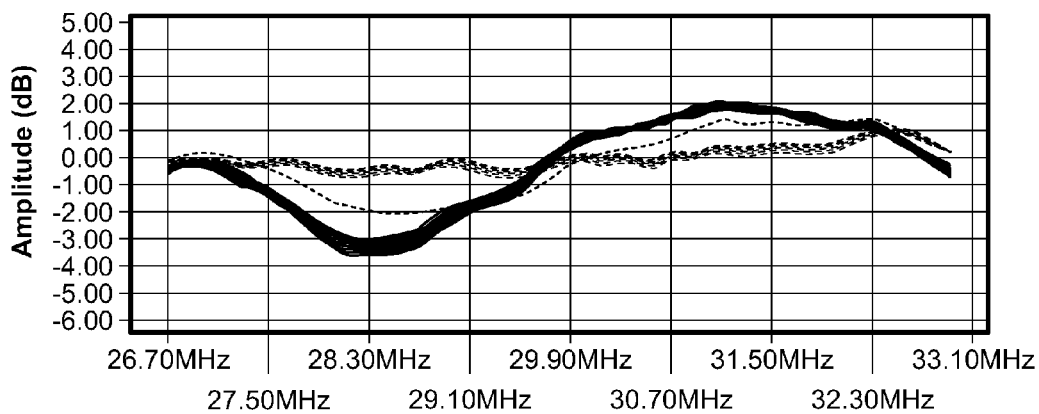

FIGS. 4-7 are graphs illustrating CPE pre-equalizer values in the time domain and resulting channel frequency responses used to correlate noise with intermittent connections with individual CPEs. More specifically, FIGS. 4 and 5 illustrate graphs 320 and 321 of a CPE operating in a normal operating environment with relatively low noise. The graph 320 of FIG. 4 illustrates the pre-equalization coefficients of the CPE whereas the graph 321 of FIG. 5 illustrates the frequency response of the transmit power. Similarly, the graphs 330 and 331 of FIGS. 6 and 7, respectively, illustrate the pre-equalization coefficients and frequency response during the intermittent noise event. As can be seen in the graphs 321 and 331, the frequency response of the transmit power of the CPE goes from being relatively flat in the non-noise environment to having a much larger amplitude in the noisy environment.

In one embodiment, the CPE polling module 130 may establish a baseline frequency response of the CPEs to perform the noise event of termination. For example, the CPE polling module 130 may poll each of the CPEs during normal operating conditions in a noise free environment and retain a baseline frequency response of the CPEs such as that illustrated by graph 321 of FIG. 5. Then, when the CPE experiences much larger amplitude in terms of frequency response, the CPE polling module 130 can determine that it is operating in a noisy environment and identify it as the CPE with the intermittent connection.

Figure 8:
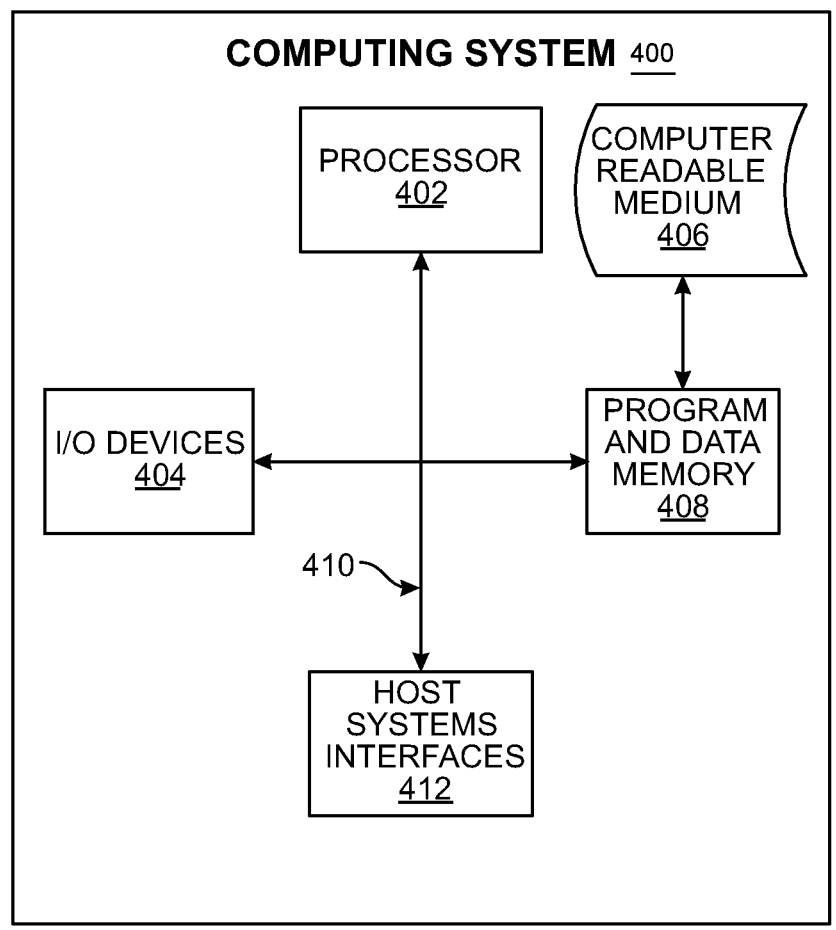
FIG. 8 is a block diagram of an exemplary computing system in which a computer readable medium provides instructions for performing methods herein.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 8 illustrates a computing system 400 in which a computer readable medium 406 may provide instructions for performing any of the methods disclosed herein.

Furthermore, the invention can take the form of a computer program product accessible from the computer readable medium 406 providing program code for use by or in connection with a computer or any instruction execution system. For the purposes of this description, the computer readable medium 406 can be any apparatus that can tangibly store the program for use by or in connection with the instruction execution system, apparatus, or device, including the computer system 400.

The medium 406 can be any tangible electronic, magnetic, optical, electromagnetic, infrared, or semiconductor system (or apparatus or device). Examples of a computer readable medium 406 include a semiconductor or solid state memory, magnetic tape, a removable computer diskette, a random access memory (RAM), a read-only memory (ROM), a rigid magnetic disk and an optical disk. Some examples of optical disks include compact disk—read only memory (CD-ROM), compact disk—read/write (CD-R/W) and DVD.

The computing system 400, suitable for storing and/or executing program code, can include one or more processors 402 coupled directly or indirectly to memory 408 through a system bus 410. The memory 408 can include local memory employed during actual execution of the program code, bulk storage, and cache memories which provide temporary storage of at least some program code in order to reduce the number of times code is retrieved from bulk storage during execution. Input/output or I/O devices 404 (including but not limited to keyboards, displays, pointing devices, etc.) can be coupled to the system either directly or through intervening I/O controllers. Network adapters may also be coupled to the system to enable the computing system 400 to become coupled to other data processing systems, such as through host systems interfaces 412, or remote printers or storage devices through intervening private or public networks. Modems, cable modem and Ethernet cards are just a few of the currently available types of network adapters.

What is claimed is:

1. A system for use in a cable television network communicatively coupled to a plurality of customer premise equipment (CPEs) through a node of the cable television network to identify a first of the plurality of CPEs with an intermittently noisy connection, the system comprising:
 a cable modem termination system (CMTS) comprising a CPE polling module; and
 a noise monitoring CPE communicatively coupled to the CMTS at a hub of the cable television network, the noise monitoring CPE monitors an upstream link from a node of the cable television network in a band of frequencies between 5 MHZ and 15 MHZ that are unused by the plurality of CPEs for upstream communications to determine when noise in the band breaches a threshold level, and transmits a message in a same manner as the plurality of CPEs to the CMTS at the time the noise breaches the threshold level indicating a breach of the threshold level,
 wherein the CPE polling module, in response to the message, transmits pre-equalization adjustments to the plurality of CPEs, polls each of the plurality of CPEs to send upstream transmit power levels, upstream pre-equalizer values, and locations of each of the plurality of CPEs, determines main tap ratios (MTRs) with respect to remaining taps based on the upstream pre-equalizer values, determines the upstream transmit power levels of each of the plurality of CPEs, and identifies the first of the plurality of CPEs with the intermittently noisy connection based on the MTRs and the upstream transmit power levels of each of the plurality of CPEs.

2. The system of claim 1, wherein: the message is formatted according to Data Over Cable Service Interface Specification (DOCSIS).

3. A method implemented in a cable television network communicatively coupled to a plurality of customer premise equipment (CPEs) through a node of the cable television network to identify a first of the plurality of CPEs with an intermittently noisy connection, the method comprising:
 monitoring with a noise monitoring CPE at a hub of the cable television network when noise in an upstream link from a node of the cable television network in a band of frequencies between 5 MHZ and 15 MHZ that are unused by the plurality of CPEs for upstream communications breaches a threshold level;
 transmitting a message from the noise monitoring CPE in a same manner as the plurality of CPEs to a cable modem termination system (CMTS) at the time the noise breaches the threshold level to indicate a breach of the threshold level; and
 in response to the message:
  transmitting pre-equalization adjustments from the CMTS to the plurality of CPEs,
  polling, at the CMTS, each of the plurality of CPEs to send upstream transmit power levels, upstream pre-equalizer values, and locations of each of the plurality of CPEs,
  determining, at the CMTS, main tap ratios (MTRs) with respect to remaining taps based on the upstream pre-equalizer values,
  determining, at the CMTS, the upstream transmit power levels of each of the plurality of CPEs, and
  identifying, at the CMTS, the first of the plurality of CPEs with the intermittently noisy connection based on the MTRs and the upstream transmit power levels of each of the plurality of CPEs.

4. The method of claim 3, wherein: the message is formatted according to Data Over Cable Service Interface Specification (DOCSIS).

5. A non-transitory computer readable medium which, when executed by one or more processors of a cable television network that is communicatively coupled to a plurality of customer premise equipment (CPEs) through a node of the cable television network, identifies a first of the plurality of CPEs with an intermittently noisy connection, the instructions directing the one or more processors to:
 monitor with a noise monitoring CPE at a hub of the cable television network when noise in an upstream link from a node of the cable television network in a band of frequencies between 5 MHZ and 15 MHZ that are unused by the plurality of CPEs for upstream communications breaches a threshold level;
 transmit a message from the noise monitoring CPE in a same manner as the plurality of CPEs to a cable modem termination system (CMTS) at the time the noise breaches the threshold level to indicate a breach of the threshold level; and
 in response to the message:
 transmit pre-equalization adjustments from the CMTS to the plurality of CPEs,
 poll, at the CMTS, each of the plurality of CPEs to send upstream transmit power levels, upstream pre-equalizer values, and locations of each of the plurality of CPEs,
 determine, at the CMTS, main tap ratios (MTRs) with respect to remaining taps based on the upstream pre-equalizer values,
 determine, at the CMTS, the upstream transmit power levels of each of the plurality of CPEs, and
 identify, at the CMTS, the first of the plurality of CPEs with the intermittently noisy connection based on the MTRs and the upstream transmit power levels of each of the plurality of CPEs.

6. The non-transitory computer readable medium of claim 5, wherein: the message is formatted according to Data Over Cable Service Interface Specification (DOCSIS).

* * * * *